United States Patent Office 3,347,682
Patented Oct. 17, 1967

3,347,682
COLORANT TABLET
Hyman Rosenstein, New York, N.Y., and Harry J. Prebluda, Trenton, N.J., assignors to Lancet Laboratories Inc., New York, N.Y., a corporation of New York
No Drawing. Filed June 23, 1966, Ser. No. 559,718
14 Claims. (Cl. 99—148)

This application is a continuation-in-part of Ser. No. 527,505, filed Feb. 15, 1966.

This invention relates to an improved colorant tablet. More particularly, the invention pertains to a colorant tablet containing an acidulation material which is substantially instantly dispersible in a liquid medium such as water. The invention is also concerned with tablets containing colorants and flavorants.

Dessert mixes comprising a gelatin carrier or other mucilaginous carriers such as gum, starches, rennet, pectin, dextrins, etc., are now prepared by admixing, for example, a colorant, a natural or artificial flavorant as well as other substances, as desired, in conventional equipment including a mixer such as a rotating drum. While this procedure is satisfactory for the preparation of a batch of dessert mixes having the desired color and, customarily, the corresponding flavor; certain problems have been encountered in the manufacture of a large number of such dessert mixes having different colors and flavors. Before a batch of gelatin having a color which is different than the flavor of the previously processed batch of gelatin can be prepared, it is necessary to effect a thorough cleaning of all the formulating and mixing equipment to prevent contamination and to obtain true color and flavor characteristics. Such a cleaning procedure is a costly and time consuming operation. Although it is possible to employ a large number of separate formulating and mixing apparatus and to use specific equipment only for certain colorants and flavorants, the cost and the space requirements are economically prohibitive. Furthermore, since certain colored-flavored dessert mixes are more popular than others, the equipment would not be used equally and, in fact, a high proportion of the equipment would remain idle for long periods of time. If large batches of certain types of dessert mixes are prepared at one time to anticipate future requirements, then storage and spoilage problems arise.

It would be desirable, therefore, to provide means for avoiding the aforementioned in the present processing procedures by preparing a dessert mix without a colorant and a flavorant to which mix the desired colorant and flavorant combination in a suitable tablet form could be conveniently added prior to the preparation of the dessert product in the usual manner. It would also be advantageous to utilize an edible acidulating material in the tablet, since the acidulant would serve to clarify hazy colloidal matter in the aqueous solution and to stabilize the final dessert product. Previous attempts to utilize such a colorant or colorant-flavorant tablet have not met with success mainly because of the inability of the tablet to disperse rapidly in the liquid medium when utilized by the housewife, restaurant or institution.

One object of the present invention is to provide a tablet comprising the required amounts of colorant and acidulant which can be added to a colorless mucilaginous dessert mix without the difficulties encountered in the previous proposals.

Another object of the present invention is to provide a colorant-flavorant-acidulant tablet which can be inserted in the package containing the dry mucilaginous dessert mix.

A further object of the present invention is to provide a colorant-acidulant tablet which is substantially instantly dispersible in water.

A still further object of this invention is to provide a colorant-flavorant tablet having the properties set forth above.

These and other objects of the present invention will become readily apparent from the ensuing description and illustrative embodiments of the invention.

In accordance with the present invention, there is provided a novel tablet, substantially instantly dispersible in water comprising a colorant, and acidulant and a dispersing or solubilizing agent. The novel tablet of this invention may also contain a flavorant. Preferably, the novel tablet of this invention weighs from about 0.6 to 4 grams and contains a sufficient amount of the colorant for use with the standard 3 ounce package or larger package of gelatin dessert mix. The weight of the tablet may, of course, vary over a wide range, e.g., about 0.1 to 15 grams or more, depending upon its end use. In place of the gelatin, there may be used other mucilaginous carriers such as water-dissoluble gum, starches, rennet, and the like.

It has been found important to employ high molecular weight polyethylene glycols as the dispersing or solubilizing agents together with a small amount of an agglomerated and/or conglomerated sugar to produce the unmottled, quickly soluble tablets of this invention. The polyethylene glycols are waxy solids having a melting or softening point about 50° C. The especially preferred polyethylene glycols are those having an average molecular weight ranging from about 3,000 to 7,500. Carbowax 4000 and Carbowax 6000, two commercially available high molecular weight polyethylene glycols, have been found particularly suitable in formulating the novel colorant tablets of this invention. The amount of dispersing or solubilizing agent employed will range from about 0.05 to 0.4%, and preferably about 0.1 to 0.2%, by weight, based on the total weight of the tablet. In accordance with another feature of this invention, the amount of dispersing agent has been found to be critical in order to achieve the desired substantially instant dispersion in water. Water which has been heated to a temperature within the range of about 20° to 90° C., and especially about 40° to 50° C., is the generally preferred dispersing medium. More specifically, it was found that if the amount of the polyethylene glycol dispersant exceeded about 0.5% by weight of the total weight of the tablet, the time of dispersion of the tablet was increased and quick dispersibility could not be achieved. This aspect of the invention will be demonstrated below.

Food, drug and cosmetic certified colors are employed and will correspond to the colorant-flavorant combinations conventionally used in this art. Illustrative primary colorants include, for example, Yellow No. 5, Yellow No. 6, Red No. 2, Red No. 3, Blue No. 1, and the like as well as combinations of these colors. Useful secondary colorants include Green No. 1, Super Black, Sky Blue, Cocoa Brown, Bottler's Grape Shade, Fast Mint, Blood Orange, Peach, Brilliant Pink, Burgundy Deep Violet, etc. In general, the amount of colorant employed will range from about 1.5 to 8%, and preferably from about 2 to 6.0%, by weight, based on the total weight of the tablet.

As previously discussed, natural or synthetic flavorants may be employed in formulating the tablets of this invention. Illustrative flavors include cherry, lemon, raspberry, watermelon, strawberry, grape, peach, banana, orange, pineapple, blackberry, and the like. The amount of flavorant employed will range from about 5 to 30%, and preferably from about 6 to 10%, by weight, based on the total weight of the tablet.

It will be understood that the colorants and flavorants employed in the practice of this invention will be those approved for food purposes by the Food and Drug Administration, and that each of these components employed need only be in sufficient amounts to impart the desired color or color-flavor to the finished dessert product.

As previously set forth, another aspect of the invention resides in the importance of incorporating a minor amount of special types of sugars in the tablets. The amount of special sugars employed will generally range from about 0.5 to 8%, and preferably from about 1 to 5%, by weight, based on the total weight of the tablet. The special type of sugars include the so-called agglomerated sugar and agglomeriated sugar admixed with conglomerated sugar. These special sugars are made up primarily of sucrose, with varying quantities of reducing sugars. The agglomerated sugar has a relatively low average bulk density, e.g., within the range of about 18 to 26 lbs./cu. ft., preferably about 22 lbs./cu. ft., and has a microscopic crystal size. Approximately 100% of the agglomerated sugar will pass through an 8 mesh Tyler standard sieve or U.S. standard sieve size, and about 20% of the agglomerated sugar will pass through a 100 mesh sieve size. One such typical agglomerated sugar which can be employed in the practice of this invention is sold commercially under the brand name Amerose. A process for manufacturing the agglomerated sugars is set forth in U.S. Patent No. 3,143,428.

An effective conglomerated sugar is sold commercially under the brand name Di-Pac, which contains about 95% sucrose and about 5% reducing sugars. The conglomerated sugar may be employed in either coarse or fine form. The average bulk density of this sugar will range from about 30 to 45 lbs./cu. ft., and preferably from about 35 to 40 lbs./cu. ft. In coarse granulation, approximately 100% of the sugar will pass through a 14 mesh size Tyler sieve, while only about 1% will pass through a 48 Tyler mesh sieve. In fine granulation, approximately 100% of the conglomerated sugar will pass through a 35 mesh size Tyler sieve, while only about 15% of the sugar will pass through a 200 mesh size Tyler sieve.

The special sugars employed herein comprise about 50 to 100% agglomerated sugar and about 0 to 50% of the conglomerated sugar, based on the total weight of the special sugars.

The organic or fatty acid component of the tablets of this invention are those which are conventionally employed in numerous foodstuffs. In general, such acidulants include fumaric acid, citric acid, tartaric acid, malic acid, maleic acid, succinic acid, adipic acid, malonic acid, ascorbic acid, etc. and mixtures thereof. The amount of acidulant employed in formulating the tablets will generally range from about 5 to 35%, and preferably from about 10 to 15%, by weight based on the total weight of the tablet. The preferred acidulants are fumaric acid or citric acid, although it will be understood that other acidulating materials may be employed without encountering any untoward results.

At times it is also desirable to incorporate an edible buffering material into the tablet in order to maintain shelf life stability and to control the final pH. Illustrative buffering agents include sodium citrate, potassium citrate, sodium malate, and the like. The amount of buffering agent employed will generally range from about 10 to 25%, and preferably from about 15 to 20%, by weight based on the total weight of the tablet.

The tablets of this invention will also contain a major amount of a carrier or filler. The preferred materials are ordinary commercial forms of sucrose, glucose, lactose, sorbitol, Methocel, guar gum, and the like. The carrier or filler may also contain a small amount of a synthetic sweetening agent such as saccharin or calcium cyclamate and the like. As previously discussed the remainder of the tablet will comprise the carrier or the filler. In general, the amount of carrier or filler will range from about 40 to 95%, and preferably from about 50 to 85%, by weight, based on the total weights of the tablet.

It will be further understood that one or more tablets may be employed in conjunction with the colorless or colorless-flavorless dessert base stock. Moreover, the weight of the tablet or tablets compared to the weight of the base stock may range from 0.05 to 10, and preferably from 0.05 to 5% by weight. Although for most purposes the tablet will be added to the mucilaginous base stock by the packager, it is also possible to furnish the tablets separately so that they may be employed as desired by the consumer.

In general, the improved colorant tablets of this invention are formed in dies by compression. According to one method, the acidulant, the colorant, the flavorant if employed, the special sugars and the carrier material are first admixed in the form of powders; and if necessary, these admixtures are initially ground to a size with the range of about 40 to 100 mesh, preferably about 80 mesh, by use of conventional grinding equipment. The resulting admixtures are then combined with a solution of the polyethylene glycol, e.g., carbowax, dried, and then reground to a particle size within the range of 5 to 20 mesh, and preferably about 10 mesh. The substantially homogeneous mixture of components are next fed by the usual means to a standard tabletting machine provided with ½ to 1 inch die to produce a 10 to 60 grain tablet. The exact shape and weight of the tablet is not critical, although for most purposes flat or wafer-contoured tablets are prepared to facilitate dispersion.

The tablets of this invention are characterized by having a substantially homogeneous appearance by being substantially instantly soluble in water. As noted above, the water may be either cold, warm, or hot, although the use of warm water is especially preferred.

The invention will be more fully understood by reference to the following illustrative examples:

*Example I*

A substantially homogeneous mixture was prepared having the formulation:

| | Grams |
|---|---|
| Red No. 2 colorant | 58 |
| Cherry flavorant | 67 |
| Conglomerated sugar | 20 |
| Agglomerated sugar | 20 |
| Fumaric acid | 150 |
| Carbowax [1] 4000 | 2 |
| Sodium citrate | 200 |
| Glucose | 483 |
| Total | 1000 |

[1] Polyethylene glycol having an average molecular weight of 4000.

The mixture was fed into a rotary tabletting machine and subjected to a pressure of about 25 p.s.i.g. to form individual tablets weighing about 0.5 gram. The resulting unmottled tablets had a round shape. One such tablet was added to approximately 90 grams of colorless gelatin, and the resulting composition added to water at a temperature of 60° C. Substantially instantaneous colorant and flavorant dispersion resulted which had outstanding clarity. The resulting gelatin product had the color and taste associated with present day commercial gelatin desserts.

*Example II*

The method of Example I was employed to prepare unmottled tablets weighing about 0.6 gram from the following composition:

| | Grams |
|---|---|
| Yellow No. 5 colorant | 60 |
| Lemon flavorant | 60 |
| Conglomerated sugar | 20 |
| Agglomerated sugar | 20 |
| Citric acid | 150 |
| Carbowax [2] 6000 | 2 |
| Sodium citrate | 200 |
| Sucrose | 488 |
| Total | 1000 |

[2] Polyethylene glycol having an average molecular weight of 6000.

A tablet thus produced was added to 90 grams of colorless gelatin and added to water under the conditions described above in Example I. The resultant gelatin product also had the color and taste associated with present day commercial gelatin desserts.

The preferred tablets of this invention will generally have the following compositions:

|  | Broad Range, wt. percent | Preferred Range, wt. percent |
| --- | --- | --- |
| Colorant | 1.5–8 | 2–6.8 |
| Flavorant | 5–30 | 6–10 |
| Organic acid | 5–35 | 10–15 |
| Polyethylene glycol | 0.05–0.5 | 0.15–0.3 |
| Buffering agent | 10–25 | 15–20 |
| Special sugars: |  |  |
| Agglomerated | 0.5–8 | 1–5 |
| Conglomerated | 0–3 | 0–2 |
| Carrier | 40–95 | 50–85 |

While particular embodiments of this invention are shown above, it will be understood that the invention is obviously subject to variations and modifications without departing from its broader aspects. Although the invention has been discussed primarily in connection with the use of water as the dispersing medium, it will also be understood that fruit juices, vegetable juices, concentrates, purees, milk, and the like may be readily employed.

What is claimed is:

1. A colorant tablet substantially instantly dispersible in water formed from a minor amount of a finely divided colorant, a minor amount of an edible organic acid, about 0.05 to 0.5% by weight of a high molecular weight polyethylene glycol melting above about 50° C., about 0.5 to 8% by weight of an agglomerated sugar, and the remainder of the tablet comprising a finely divided inert carrier selected from the group consisting of sucrose, glucose, lactose, sorbitol, Methocel and guar gum.

2. The tablet of claim 1 wherein said polyethylene glycol has an average molecular weight within the range of about 3000 to 7500.

3. The tablet of claim 1 wherein said organic acid is fumaric acid.

4. The tablet of claim 1 containing a minor amount of a finely divided flavorant.

5. The tablet of claim 1 wherein said organic acid is citric acid.

6. The tablet of claim 1 wherein said carrier is guar gum.

7. The tablet of claim 1 containing a minor amount of an edible buffering agent.

8. A colorant-flavorant tablet formed from the following constituents:

| | Percent by wt. |
| --- | --- |
| Colorant | 1.5–8 |
| Flavorant | 5–30 |
| Edible organic acid | 5–35 |
| Buffering agent | 10–25 |
| Polyethylene glycol having a molecular weight of about 3000 to 7500 | 0.05–0.5 |
| Agglomerated sugar | 0.5–8 |
| Conglomerated sugar | 0–3 |
| Sugar carrier selected from the group consisting of sucrose, glucose, lactose, sorbitol, Methocel and guar gum | Remainder |

9. A water soluble gelatin composition comprising a major amount of a finely divided mucilaginous material and at leats one tablet formed from a minor amount of finely divided colorant, a minor amount of a finely divided flavorant, a minor amount of an edible organic acid, about 0.05 to 0.5% by weight of a high molecular weight polyethylene glycol having a molecular weight within the range of about 3000 to 7500 and melting above about 50° C., about 0.5 to 8% by weight of an agglomerated sugar, about 0 to 3% by weight of a conglomerated sugar, and a major amount of a finely divided sugar carrier.

10. The composition of claim 9 wherein said mucilaginous material is gelatin.

11. The composition of claim 9 wherein said organic acid is fumaric acid.

12. The composition of claim 9 wherein said organic acid is citric acid.

13. The composition of claim 9 wherein said sugar carrier is glucose.

14. The composition of claim 9 wherein said sugar carrier is sucrose.

References Cited

UNITED STATES PATENTS

| 1,841,432 | 1/1932 | Clarke | 167—82 |
| 2,042,581 | 6/1936 | Blount | 99—130 |
| 2,400,292 | 5/1946 | Dalton | 127—30 |
| 2,540,253 | 2/1951 | Gakenheimer | 99—78 |
| 2,807,559 | 9/1957 | Skiner | 127—30 |
| 2,889,226 | 6/1959 | Hinkley | 99—66 |
| 2,893,871 | 7/1959 | Griffin | 99—56 |
| 2,900,256 | 8/1959 | Scott | 99—56 |
| 2,954,306 | 9/1960 | Bond et al. | 127—63 |

OTHER REFERENCES

Merory, Food Flavorings, The Avi Publishing Co. Inc. Westport, Conn. 1960, p. 269 to 270.

Whistler et al.: Industrial Gums, Academic Press New York, 1959, page 323.

A. LOUIS MONACELL, *Primary Examiner.*

RAYMOND N. JONES, *Examiner.*

H. H. KLARE, *Assistant Examiner.*